United States Patent [19]

Farwell et al.

[11] Patent Number: 5,368,180
[45] Date of Patent: Nov. 29, 1994

[54] PERFORATED RUPTURE DISK ASSEMBLY

[75] Inventors: Stephen P. Farwell, Owasso; Edward H. Short, III, Tulsa; John A. Tomasko, Claremore, all of Okla.

[73] Assignee: BS&B Safety Systems, Inc., Tulsa, Okla.

[21] Appl. No.: 135,082

[22] Filed: Oct. 12, 1993

[51] Int. Cl.⁵ .............................. F16K 13/00
[52] U.S. Cl. ..................... 220/89.2; 137/68.1
[58] Field of Search ............ 220/89.2; 137/68.1

[56] References Cited

U.S. PATENT DOCUMENTS

| | | | |
|---|---|---|---|
| 2,716,506 | 8/1955 | Fike | 220/89.2 |
| 2,980,286 | 4/1961 | Coffman | 220/89.2 |
| 3,169,658 | 2/1965 | Porter | 220/89.2 |
| 3,294,277 | 12/1966 | Wood | 220/89 |
| 3,484,817 | 12/1969 | Wood | 220/89 |
| 3,921,556 | 12/1975 | Wood et al. | 113/120 R |
| 4,207,913 | 6/1980 | Fike, Jr. | 220/89.2 X |
| 4,819,823 | 4/1989 | Kadakia et al. | 220/89.2 |
| 4,905,722 | 3/1990 | Rooker et al. | 220/89.2 X |
| 5,036,632 | 8/1991 | Short et al. | 52/1 |
| 5,167,337 | 12/1992 | Short et al. | 220/89.2 |

*Primary Examiner*—Steven M. Pollard
*Attorney, Agent, or Firm*—Dougherty, Hessin, Beavers & Gilbert

[57] ABSTRACT

An improved pressure relieving rupture disk assembly is provided which includes a rupture disk having at least one perforation therein. The perforation at least partially defines a blow-out part in the rupture disk which opens and relieves pressure therethrough when the perforation is sealed and a pressure differential of predetermined magnitude is exerted on the rupture disk. A sealing member is positioned over the perforation in the rupture disk for sealing the perforation when a pressure differential is exerted on the rupture disk.

16 Claims, 3 Drawing Sheets

PERFORATED RUPTURE DISK ASSEMBLY

BACKGROUND OF THE INVENTION

1. Field of the Invention

The present invention relates generally to pressure relieving rupture disk assemblies, and more particularly, to an improved low pressure relieving rupture disk assembly wherein a blow-out part is at least partially defined by one or more perforations.

2. Description of the Prior Art

Many rupturable pressure relief devices have been developed and used heretofore. Generally, such devices have included a rupture disk supported between a pair of support members or flanges which are in turn connected to a relief passageway in a vessel or system containing fluids under pressure. When the fluid pressure within the vessel or system exceeds the predetermined rupture pressure of the disk, rupture occurs causing pressurized fluid to be relieved from the vessel or system.

Rupture disks of the reverse buckling type have heretofore been developed and used successfully. Reverse buckling rupture disks generally include a dome-shaped portion and the fluid pressure from the vessel or system being protected is exerted on the convex side of the disk. Upon failure, the dome-shaped portion reverses and then ruptures. Originally, all reverse buckling rupture disk assemblies included knife blades positioned adjacent the rupture disks thereof on the outlet sides of the disks. On reversal, the disks impaled on the knife blades causing them to open in a predetermined manner. More recently, reverse buckling rupture disks have included scores on a surface thereof which create lines of weakness therein so that upon reversal, the disks tear along the lines of weakness.

U.S. Pat. No. 3,294,277 issued Dec. 27, 1966 to Wood describes a reverse buckling rupture disk with knife blades. U.S. Pat. No. 3,484,817 issued Dec. 16, 1969 to Wood describes the construction and operation of scored reverse buckling rupture disks. A method of manufacturing scored reverse buckling rupture disks is described in U.S. Pat. No. 3,921,556 issued Nov. 25, 1975 to Wood et al. U.S. Pat. No. 5,167,337 issued Dec. 1, 1992 to Short et al. describes a C-scored reverse buckling rupture disk assembly for high pressure applications including means for catching and supporting the hinge area of the blow-out part formed by the C-shaped score.

While scored reverse buckling rupture disks have been used successfully and have obviated the need for knife blades in high pressure applications, scored reverse buckling rupture disks have only achieved varying degrees of success in low pressure applications. Consequently, knife blades have still had to be utilized with reverse buckling rupture disks utilized in such low pressure applications. The inclusion of the knife blades causes the resulting rupture disk assemblies to be relatively expensive.

Thus, there is a need for an improved rupture disk assembly which can be utilized in low pressure applications without the need for knife blades or the like.

SUMMARY OF THE INVENTION

By the present invention, an improved pressure relieving rupture disk assembly is provided which overcomes the short comings of the prior art and meets the need described above. The assembly is basically comprised of a rupture disk having at least one perforation therein at least partially defining a blow-out part in the rupture disk which opens and relieves pressure when the perforation is sealed and a pressure differential of predetermined magnitude is exerted on the rupture disk. A sealing member is positioned over the perforation whereby the sealing member seals the perforation when a pressure differential is exerted on the rupture disk.

In a preferred embodiment of the present invention, the rupture disk has a dome-shaped portion connected to an annular flange portion and the sealing member also functions as a peripheral gasket for the rupture disk. One or more arcuate slits are formed in the flange portion of the rupture disk which define a hinged circular blow-out part therein. When more than one arcuate slit is utilized, the ends of the slits are preferably connected by scores which further weaken the disk and define the blow-out part therein. A second peripheral gasket is positioned on the opposite side of the rupture disk from the sealing member to enhance the sealing of the rupture disk between support members and the sealing of the slit or slits.

It is, therefore, a general object of the present invention to provide an improved perforated rupture disk assembly.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Figure 1:
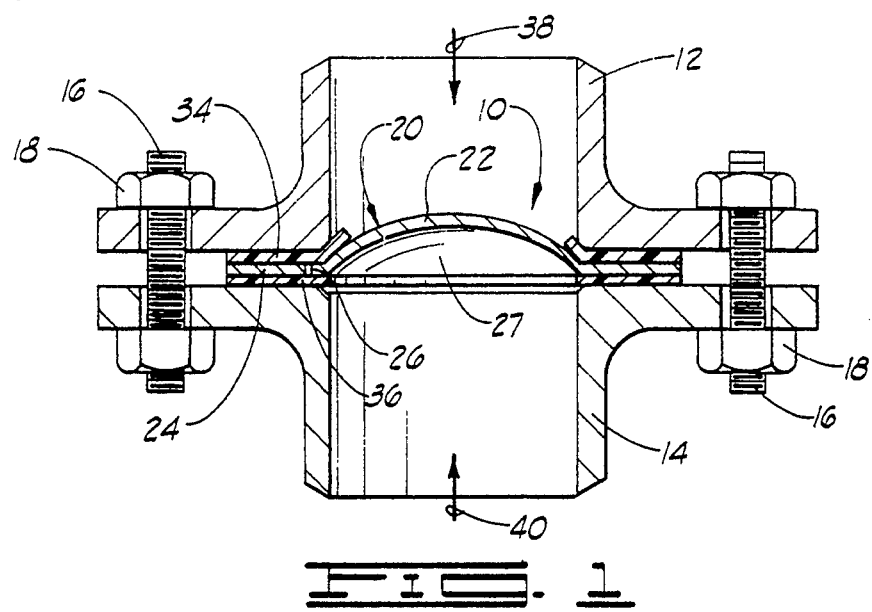
FIG. 1 is a side cross-sectional view of a perforated pressure relieving rupture disk assembly of the present invention clamped between a pair of flanges.
Figure 2:
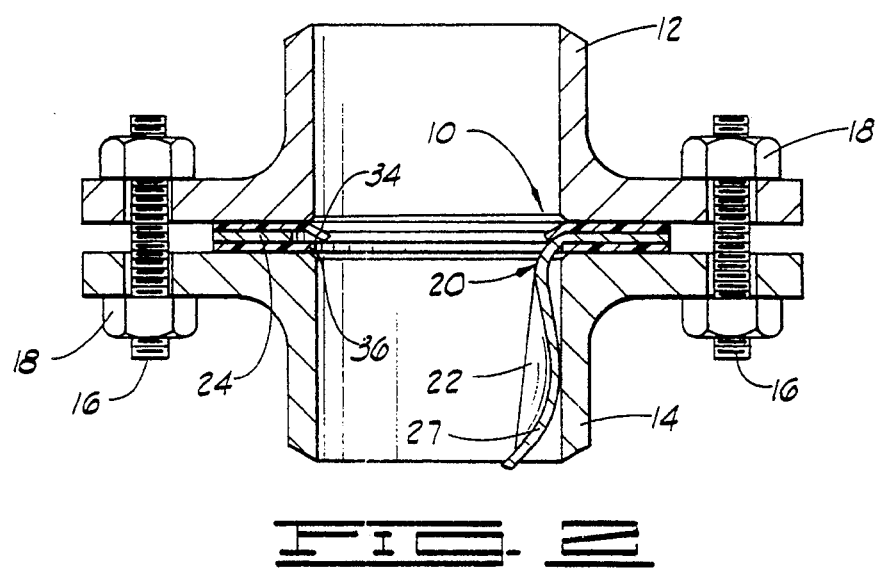
FIG. 2 is a side cross-sectional view of the assembly of FIG. 1 illustrating the rupture disk thereof after reversal and rupture.
Figure 3:
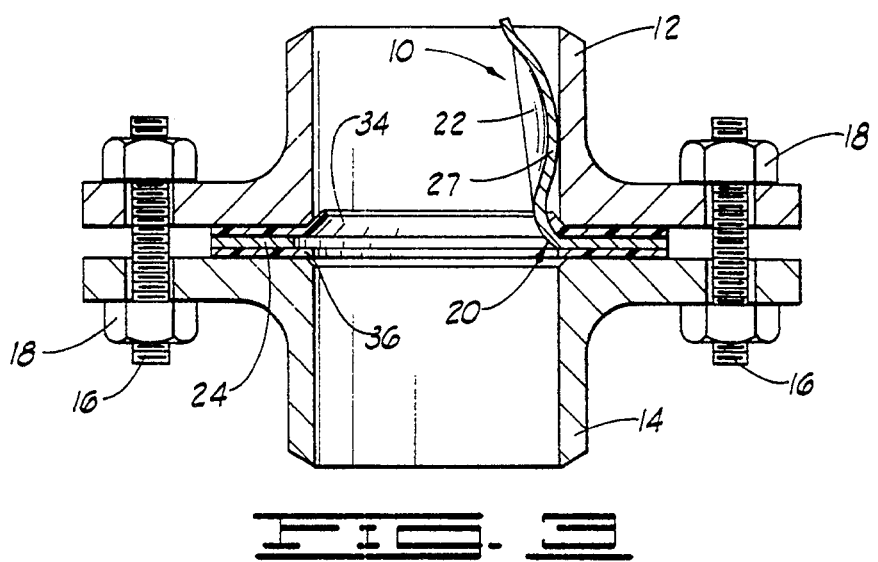
FIG. 3 is a side cross-sectional view of the assembly of FIG. 1 illustrating the rupture disk thereof after rupture in the opposite direction.
Figure 4:
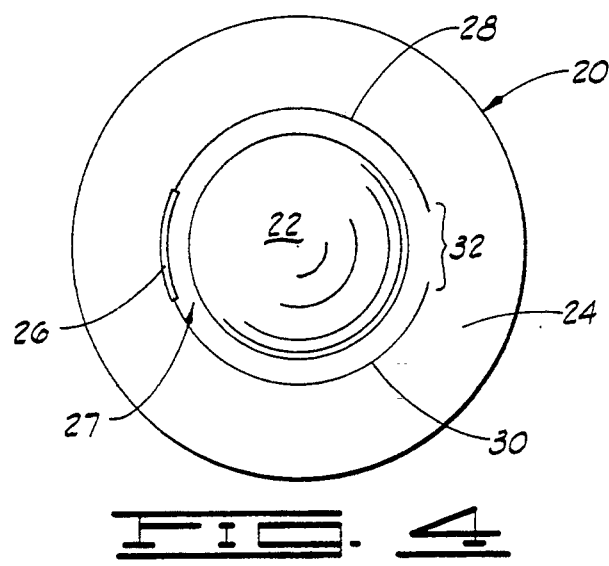
FIG. 4 is a top plan view of the rupture disk of FIG. 1.

Referring now to the drawings and particularly to FIG. 1–4, a perforated rupture disk assembly of the present invention is illustrated and generally designated by the numeral 10. The assembly 10 is shown clamped between a pair of support members, i.e., inlet and outlet pipe flanges 12 and 14, respectively, by a plurality of studs and nuts 16 and 18. The perforated rupture disk assembly 10 is comprised of a rupture disk 20 having a dome-shaped portion 22 connected to an annular flat flange portion 24. As shown best in FIG. 4, the rupture disk 20 includes a perforation in the flat flange portion 24 thereof in the form of an arcuate slit 26. The arcuate slit 26 partially defines a circular blow-out part 27 in the rupture disk 20. A pair of arcuate scores 28 and 30 connected to the ends of the slit 26 also define the circular blow-out part 27 which includes the dome-shaped portion 22 of the rupture disk 20. The ends of the scores 28 and 30 opposite from those connecting with the ends of the slit 26 define an unscored hinge area 32. When the blow-out part 27 opens it stays attached to the remaining part of the rupture disk 20 as shown in FIGS. 2 and 3 and as will be described further hereinbelow. The terms "score" or "scores" are used herein to mean one or more grooves or indentations which form lines of weakness in the rupture disk 20 along which the blow-out part 27 tears when it opens.

As illustrated in FIGS. 1-3, the assembly 10 includes an annular sealing member 34 positioned adjacent the annular flat flange portion 24 of the rupture disk 20. The annular sealing member 34 is of a size such that it functions as a peripheral gasket for the rupture disk 20 and as a sealing member for the slit 26, i.e., it extends over the slit 26. As also shown in FIGS. 1-3, the sealing or gasket member 34 preferably extends inwardly over a peripheral part of the dome-shaped portion 22 of the rupture disk 20 so that a relatively large sealing area is provided inwardly of the slit 26. A second gasket member 36 is optionally positioned adjacent the flange portion 24 of the rupture disk 20 on the opposite side of the rupture disk 20 from the member 34.

The gasket members 34 and 36 are each formed of a flexible material whereby they readily seal the slit 26 when a pressure differential is exerted on the rupture disk 20. That is, when a pressure differential is exerted on the rupture disk 20 in the direction shown by the arrow 38, the slit 26 is sealed as a result of the gasket member 34 being forced by the pressure differential downwardly against the slit 26, and also by the second gasket member 36 as a result of the pressure differential forcing the entire rupture disk 20 against tile second gasket member 36. When a pressure differential is exerted on the rupture disk assembly 10 in the opposite direction, i.e., in the direction shown by the arrow 40, the pressure differential forces the rupture disk 20 toward the gasket member 34 whereby the slit 26 is sealed thereby.

As will be understood by those skilled in the art, manufacturing variables such as the thickness and type of material making up the rupture disk 20, the length of the slit 26 and the lengths and characters of the scores 28 and 30 determine the magnitude of pressure differential in the direction indicated by the arrow 38 which is required to cause the rupture disk 20 to reverse and rupture when the slit 26 is sealed by the gasket members 34 and 36. Such manufacturing variables are controlled whereby the rupture disk 20 has a predetermined design rupture pressure differential which will cause it to reverse and the blow-out part 27 thereof to open and relieve pressure. That is, at pressure differentials below the predetermined design rupture pressure differential, the slit 26 is sealed by the gasket members 34 and 36 and pressurized fluid contained by the rupture disk 20 is prevented from leaking through the slit 26. When the pressure differential exerted on the rupture disk 20 equals or exceeds the predetermined design rupture pressure differential, the dome-shaped portion 22 of the rupture disk 20 reverses, the blow-out part 27 tears along the scores 28 and 30 and the blow-out part 27 opens as illustrated in FIG. 2 whereby pressurized fluid is relieved through the rupture disk assembly 10.

When a pressure differential is exerted in the opposite direction, i.e., in the direction illustrated by the arrow 40, the rupture disk 20 prevents pressure relief in the direction 40 until a predetermined design rupture pressure differential is reached where upon the blow-out part 27 tears along the scores 30 and opens as illustrated in FIG. 3. Because the rupture disk 20 is perforated, the rupture disk 20 reliably opens in either direction at low pressures. As mentioned, because the ends of the scores 28 and 30 define an unscored hinge area 32 in the rupture disk 20 (FIG. 4), the blow-out part 27 of the rupture disk 20 stays attached to the remaining part of the rupture disk 20 when rupture occurs in either direction.

A variety of perforations such as holes, slots or slits and combinations of such perforations and scores can be utilized in the rupture disk of the present invention to obtain a predetermined design rupture pressure differential at which the rupture disk ruptures. For example, referring to FIG. 5, a plurality of spaced arcuate slits 38 defining a circular blow-out part 43 can be utilized, the ends of which are connected by a plurality of scores 40. An unscored hinge area 42 is provided between the ends of two adjacent scores 40 as shown.

Figure 5:
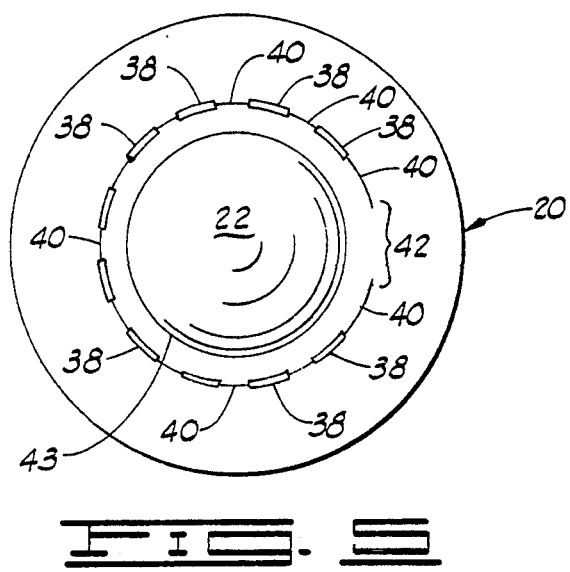
FIG. 5 is a top plan view of an alternate form of the rupture disk of the present invention.

In operation of the embodiment of the rupture disk 20 illustrated in FIG. 5, when a pressure differential of predetermined magnitude is reached in either direction, the blow-out part 43 tears between the slits 38 along the scores 40 while staying attached to the remaining part of the rupture disk 20 at a hinge area 42.

Figure 6:
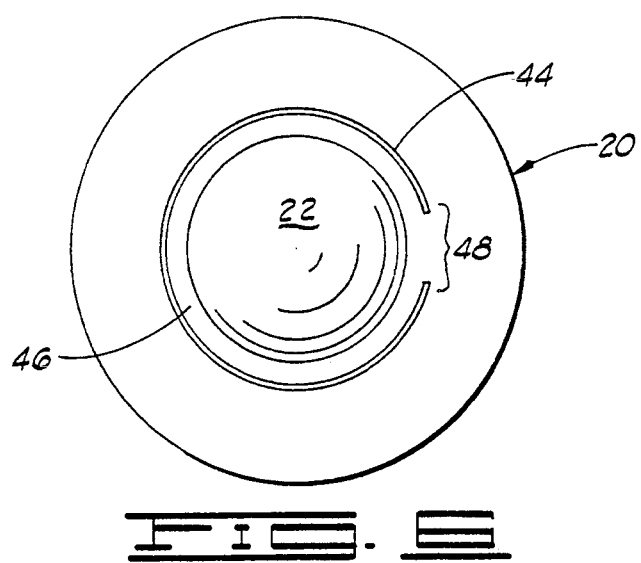
FIG. 6 is a top plan view of another alternate form of the rupture disk of the present invention.

In very low pressure applications, a single perforation in the form of a C-shaped arcuate slit 44 can be utilized as illustrated in FIG. 6. The arcuate slit 44 defines a hinged circular blow-out part 46 which is attached to the remaining part of the rupture disk 20 by an unslit hinge area 48.

In operation of the embodiment of the rupture disk 20 illustrated in FIG. 6, when a predetermined design rupture pressure differential is reached in either direction, the blow-out part 46 opens but stays attached to the remaining part of the rupture disk at the hinge area 48.

Figure 7:
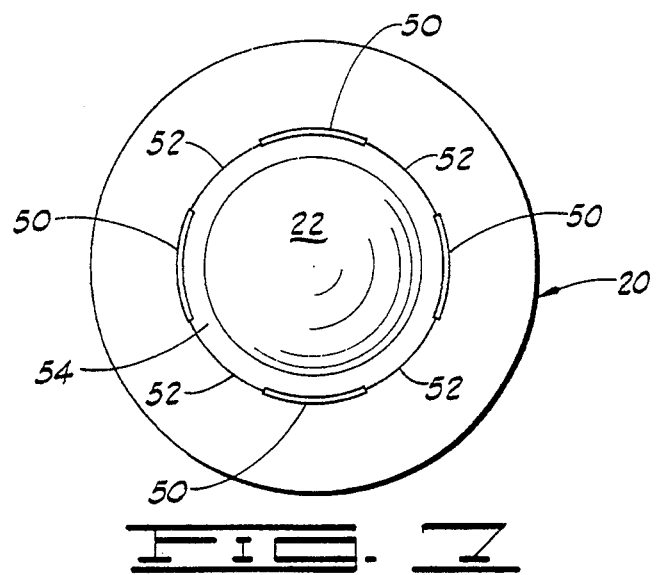
FIG. 7 is a top plan view of still another alternate form of the rupture disk of this invention.

As illustrated in FIG. 7, yet another form of the rupture disk 20 is illustrated. That is, a plurality of spaced arcuate slits 50 connected by arcuate scores 52 are formed in the rupture disk 20 defining a circular blow-out part 54 therein. The arrangement of slits 50 and scores 52 in rupture disk 20 illustrated in FIG. 7 and other similar arrangements of perforations and scores whereby a hinge area is not included are utilized in applications where it is unnecessary to retain the blow-out part when pressure is relieved through the rupture disk.

Figure 8:
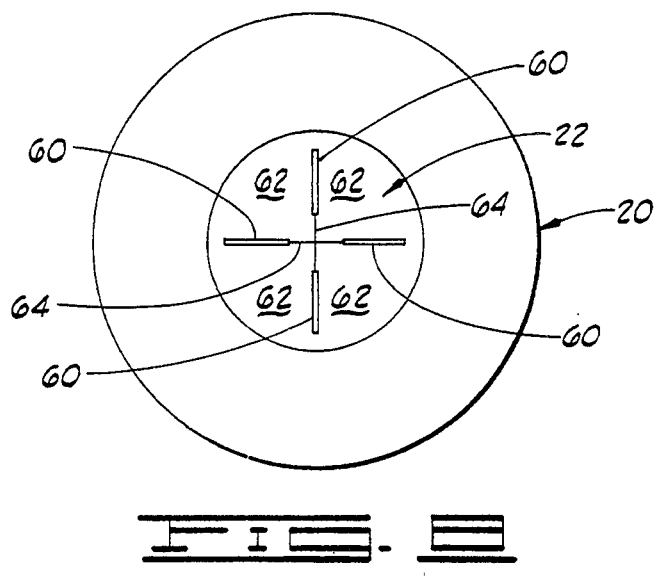
FIG. 8 is a top plan view of yet another alternate form of the rupture disk of this invention.

As will now be understood by those skilled in the art, the perforations in the rupture disk 20 can take various forms and can define hinged or non-hinged blow out parts of various shapes. For example, as show in FIG. 8, the perforations can be slits 60 which define a plurality of sector-shaped blow-out parts 62 in the dome-shaped portion 22 of the rupture disk 20. Intersecting scores 64 can connect the interior ends of the slits 60 as shown.

Figure 9:
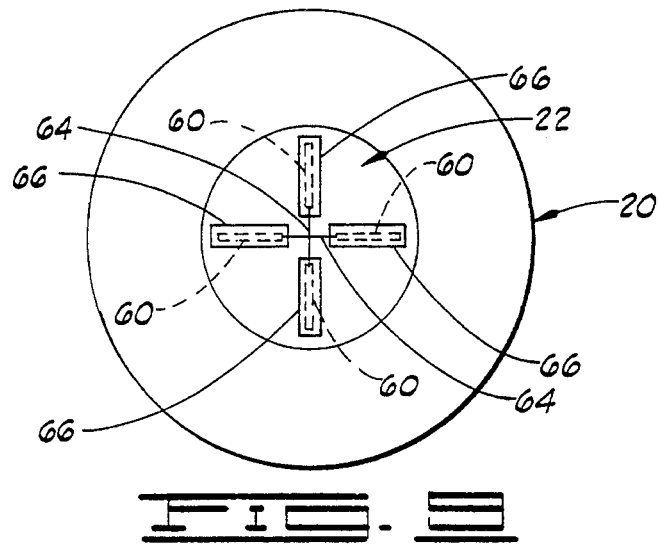
FIG. 9 is a top plan view of the rupture disk of FIG. 8 having sealing members attached thereto.

As will also be understood, the perforations can be sealed using any of a variety of sealing members such as adhesive tape, hardenable sealant, or the like. FIG. 9 illustrates tile rupture disk 20 of FIG. 8 sealed with strips of adhesive tape 66.

Thus, the present invention is well adapted to carry out the objects and attain the ends and advantages mentioned as well as those inherent therein. While numerous changes can be made in the construction and arrangement of parts, such changes are encompassed within the spirit of this invention as defined by the appended claims.

What is claimed is:

1. A perforated pressure relieving rupture disk assembly adapted to be sealingly clamped across a pressurized fluid-containing passageway comprising:
   a rupture disk having a dome-shaped portion connected to an annular flat flange portion and having one or more perforations in said annular flat flange portion which at least partially define a circular blow-out part in said rupture disk, said blow-out part opening and relieving pressure therethrough when said perforations are sealed and a pressure differential of predetermined magnitude is exerted on said rupture disk; and
   a first annular gasket member positioned adjacent to said annular flat flange portion of said rupture disk and extending over said perforations therein whereby said gasket member seals said perforations when a pressure differential is exerted thereon and on said rupture disk.

2. The assembly of claim 1 which further comprises a second annular gasket member positioned on the opposite side of said rupture disk from said first gasket member.

3. The assembly of claim 2 which further comprises inlet and outlet rupture disk support members adapted to be sealingly clamped together with said annular flange portion of said rupture disk and said gasket members therebetween.

4. The assembly of claim 3 wherein said perforations are slits and said rupture disk further includes at least one score thereon which partially defines said circular blow-out part therein.

5. The assembly of claim 4 wherein said rupture disk includes a plurality of slits, the ends of which are connected by a plurality of scores.

6. The assembly of claim 5 wherein said blow-out part is a hinged blow-out part which remains attached to said rupture disk upon opening.

7. A perforated pressure relieving rupture disk assembly adapted to be sealingly clamped across a pressurized fluid-containing passageway comprising:
   a rupture disk having a dome-shaped portion connected to an annular flat flange portion and having at least one slit in said annular flat flange portion which at least partially defines a hinged circular blow-out part in said rupture disk which remains attached to said rupture disk upon opening, said blow-out part opening and relieving pressure therethrough when said slit is sealed and a pressure differential of predetermined magnitude is exerted on said rupture disk; and
   a first annular gasket member positioned adjacent to said annular flat flange portion of said rupture disk and extending over said slit therein whereby said gasket member seals said slit when a pressure differential is exerted thereon and on said rupture disk.

8. The assembly of claim 7 wherein an interior portion of said first gasket member extends inwardly over a peripheral part of said dome-shaped portion of said rupture disk to provide an enlarged sealing area inwardly of said slit.

9. The assembly of claim 8 which further comprises a second annular gasket member positioned on the opposite side of said annular flat flange portion of said rupture disk from said first gasket member.

10. The assembly of claim 9 which further comprises inlet and outlet rupture disk support members adapted to be sealingly clamped together with said annular flange portion of said rupture disk and said first and second gasket members therebetween.

11. The assembly of claim 10 wherein said rupture disk further includes at least one score thereon which partially defines said circular blow-out part therein.

12. The assembly of claim 11 wherein said rupture disk includes a plurality of slits, the ends of which are connected by a plurality of scores.

13. A perforated pressure relieving rupture disk assembly adapted to be sealingly clamped across a pressurized fluid-containing passageway comprising:
   a rupture disk having a dome-shaped portion connected to an annular flat flange portion and having a least one slit in said annular flat flange portion which at least partially defines a hinged circular blow-out part in said rupture disk which remains attached to said rupture disk upon opening, said blow-out part opening and relieving pressure therethrough when said slit is sealed and a pressure differential of predetermined magnitude is exerted on said rupture disk; and
   a first annular gasket member positioned adjacent to said annular flat flange portion of said rupture disk and extending over said slit therein whereby said gasket member seals said slit when a pressure differential is exerted thereon and on said rupture disk;
   a second annular gasket member positioned on the opposite side of said annular flat flange portion of said rupture disk from said first gasket member; and
   inlet and outlet rupture disk support members adapted to be sealingly clamped together with said annular flange portion of said rupture disk and said first and second gasket members therebetween.

14. The assembly of claim 13 wherein an annular interior portion of said first gasket member extends inwardly over a peripheral part of said dome-shaped portion of said rupture disk to provide an enlarged sealing area inwardly of said slit.

15. The assembly of claim 14 wherein said rupture disk further includes at least one score thereon which partially defines said circular blow-out part therein.

16. The assembly of claim 15 wherein said rupture disk includes a plurality of slits, the ends of which are connected by a plurality of scores.

* * * * *